United States Patent
L'Huillier et al.

(10) Patent No.: US 11,589,574 B2
(45) Date of Patent: Feb. 28, 2023

(54) COMPOSITIONS AND METHODS FOR TRANSPORT AND PRESERVATION OF BIOLOGICAL MATERIAL

(71) Applicant: AMERICORD REGISTRY LLC, New York, NY (US)

(72) Inventors: Andrew L'Huillier, Edison, NJ (US); Ayanna Bryan, Bloomfield, NJ (US); Martin Smithmyer, New York, NJ (US)

(73) Assignee: AMERICORD REGISTRY LLC, New York, NY (US)

( * ) Notice: Subject to any disclaimer, the term of this patent is extended or adjusted under 35 U.S.C. 154(b) by 142 days.

(21) Appl. No.: 16/748,288

(22) Filed: Jan. 21, 2020

(65) Prior Publication Data

US 2020/0229426 A1   Jul. 23, 2020

Related U.S. Application Data

(60) Provisional application No. 62/794,050, filed on Jan. 18, 2019.

(51) Int. Cl.
*A01N 1/02* (2006.01)

(52) U.S. Cl.
CPC .................. *A01N 1/0221* (2013.01)

(58) Field of Classification Search
None
See application file for complete search history.

(56) References Cited

U.S. PATENT DOCUMENTS

| | | | |
|---|---|---|---|
| 2012/0128641 A1* | 5/2012 | Austen, Jr. | A01N 1/0221 435/325 |
| 2017/0151198 A1* | 6/2017 | Mangino | A01N 1/0221 |
| 2020/0230175 A1* | 7/2020 | L'Huillier | C12N 5/0087 |
| 2021/0267190 A1* | 9/2021 | Bessette | A01N 1/021 |

* cited by examiner

*Primary Examiner* — Ralph J Gitomer
(74) *Attorney, Agent, or Firm* — George McGuire

(57) ABSTRACT

Compositions and methods for the shipping, packaging, and freezing of whole or partial biological materials including but not limited to cells, tissues, and organs, designed to simultaneously reduce freezing damage and maintain tissue structure. The compositions include a buffered hyperosmotic solution, an oncotic agent, an antioxidant, a metal chelator, and a ketone body. These aspects of the present invention are applicable to transport and preservation of biological materials including but not limited to amniotic membrane of the placenta and umbilical cord and are applicable to preservation of cellular and acellular biological materials generally.

17 Claims, 2 Drawing Sheets

COMPOSITIONS AND METHODS FOR TRANSPORT AND PRESERVATION OF BIOLOGICAL MATERIAL

CROSS-REFERENCE TO RELATED APPLICATION

The present application claims priority to and the benefit of U.S. Provisional Patent Application No. 62/794,050, filed on Jan. 18, 2019 and entitled "Isolation and Cryopreservation of Amniotic Membrane Sheets," the entirety of which is incorporated herein by reference.

BACKGROUND OF THE INVENTION

1. Field of the Invention

The present disclosure is directed generally to transport and cryopreservation of biological materials and, more particularly, to medias for the transport of biological materials to preserve viability and structure, cryopreservatives to preserve viability and structure during the freezing process, and devices for maintaining structure of biological materials during the freezing process

2. Description of Related Art

Transport medias have been used for decades both for the transport and short-term storage of biological materials for research and medical purposes. These solutions focus principally on three major facets of cellular and tissue health to maintain viability and function during transport and storage: osmotic stability of cells, metabolic support, and protection from chemical damage. These solutions are often combined with transport containers or medical devices which can further provide physical protection, temperature control, and gas exchange.

While great advances have been made in the art, there remains a need for improving all facets of cellular and tissue protection during transport and storage. Balancing these facets which affect cell and tissue health can be challenging as modifying one can often change another for the worse. For example, temperature is often decreased to approximately 4° C. to reduce cellular metabolism. Aerobic metabolism generates reactive oxygen species, so this reduced metabolism reduces chemical damage caused by reactive oxygen species. Consequently, the proteins which maintain cell osmolarity have reduced or absent function at low temperature, leading to cell swelling. This swelling can cause cell lysis and disrupt organelles, leading itself to generation of free radicals and cell death.

To overcome this, many transport and storage solutions are hypertonic with solute concentrations approaching intracellular levels. Oncotic agents which do not cross the cell membrane are also commonly used to prevent excessive water from entering the cells, a strategy similar to treating hemorrhagic shock. Disaccharides are often selected as the oncotic agents as they are not readily taken up by most cells and have little to no toxicity. Trehalose, sucrose, and raffinose are three such disaccharides which are naturally occurring.

Antioxidants are commonly used to mitigate ROS production that may still occur. The most common antioxidant used is glutathione, a principal antioxidant produced by human cells. Glutathione, however, has low stability during storage, and often must be added to transport medias just prior to use.

To support cellular metabolism, glucose has been employed as fuel for glycolysis. Adenosine has also been used to ensure maintenance of ATP levels. Glycolysis, however, leads to high ROS production, which has been the primary rationale for reducing temperature during shipping and storage.

Another potential source of ROS production during transport and storage of biological materials are metal ions such as iron. Metal ions can undergo reactions leading to heavy free radical production resulting in tissue damage. Metals can have other detrimental effects on cells as well, including the presence of high amounts of calcium which, via calcium flux in cells, can lead to apoptosis.

Cryopreservation has enabled scientific studies that would not otherwise be possible by preserving cell lines and primary cells for future studies without the need to constantly source fresh cells. It has also revolutionized fertility practices for both humans and animals, allowing couples to conceive children through difficult procedures or passage of time, and changing how animal husbandry is conducted at scale. Cryopreservation has also brought about the practice of biobanking, the preservation and storage of cells and tissues for later medical use. Biobanking is at the center of the growing field of cellular therapeutics which is one of the fastest growing segments of regenerative medicine and cancer treatment.

The basic concept behind cryopreservation borrows from animals found in nature such as frogs and deep-sea fish that are capable of surviving being frozen. The molecules that allow these animals this ability share the general property of inhibiting or modulating ice crystal formation, which is the major source of cellular and tissue damage during freezing. Molecules commonly added to cells and tissues to preserve their viability through the freeze-thaw process, termed cryoprotectants, including glycerol, DMSO, and polyvinyl alcohol, are all used to this effect and have allowed for decades of cryopreservation in laboratory settings. Most commonly used cryoprotectants, however, exhibit some level of toxicity at concentrations used. In addition, while cryoprotectants modulate ice crystal formation to prevent the worst of the damage during the freezing process, cells can still become damaged at hypothermic temperatures during freezing, thawing, and intermittent periods of accidentally increased temperatures commonly referred to in the art as transient warming events. Most commonly used methods employ a controlled freezing rate, often around 1° C. per minute, from room temperature to around −80° C. to freeze a biological material, after which the material can optionally be reduced further in temperature for long term storage, or lyophilized. Slower rates of cooling can minimize ice crystal formation but mean a longer period at hypothermic temperatures which induce cell swelling and ROS production.

An ideal cryoprotectant solution will have no toxicity, support biological stability at hypothermic temperatures for protection during the freezing and thawing stages, and protect biological materials from chemical and physical damage including ROS and ice crystal formation. By utilizing aspects of medias used during transport of biological materials in hypothermic conditions, the outcomes of cryopreservation may be dramatically improved.

Cryopreservation of cells is a well-established practice. Cells are relatively easy to preserve frozen both as a suspension of cells within a cryoprotectant, or as a pellet of cells in a cryoprotectant. Even so, rare cell types such as primary stem cells are especially precious, and improved outcomes post-thaw are still needed. Whole and partial tissues are far more difficult to cryopreserve, and some cell types are far more sensitive to freezing than others. One of the major difficulties in the art for preservation of tissues is that tissues require a specific structure for their function which must be maintained during the freezing process. Packing a tissue into a container for cryopreservation that does not properly support the tissue can compress portions of the tissue together that are normally separate. This can create several problems during the freezing process. The first of these is that compressing tissue together decreases tissue surface area exposed to cryoprotectant, reducing penetration of cryoprotectants into the tissue and leading to uneven distribution. This can compromise portions of the tissue, leading to failure of the tissue overall even if portions of the tissue remain viable. Second, compressing the tissue in a way where one section of the tissue contacts another section of the tissue can lead to ice crystal formation in one portion of the tissue propagating into the other portion of the tissue.

Traditional devices used for cryopreservation include cryotubes and cryobags. These containers are often not adequate for separating and spreading tissues in a manner that optimizes distribution and penetration of cryoprotectant and prevents compression and intra-tissue contact within the container.

Therefore, there is a need for a composition and media for safe transportation and storage of biological samples.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

BRIEF SUMMARY OF THE INVENTION

Embodiments of the present invention are directed to a composition for the transport of biological material and a method of for the preservation of biological material. According to one aspect, the composition includes: a buffered hyperosmotic solution, an oncotic agent, an antioxidant, a metal chelator, and a ketone body.

According to another aspect, the composition additionally comprises a polymer.

According to yet another aspect, the method includes the steps of: (i) providing a flexible, permeable support device; (ii) layering the biological material onto the support device; (iii) placing the support device within a container; and (iv) adding a cryoprotectant composition to the container.

These and other aspects of the invention will be apparent from and elucidated with reference to the embodiment(s) described hereinafter.

BRIEF DESCRIPTION OF THE DRAWINGS

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments. Reference is now made briefly to the accompanying drawings, in which.

DETAILED DESCRIPTION OF THE INVENTION

Figure 1:
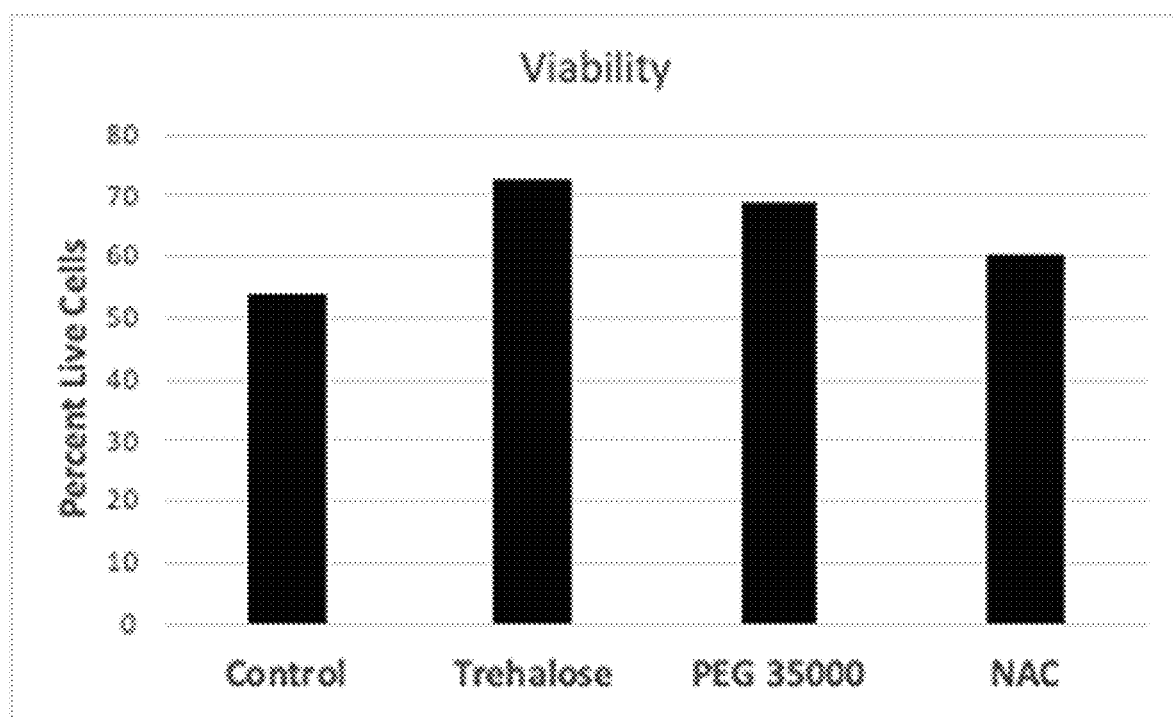
FIG. 1 is a chart depicting the viability of frozen human cord blood cells in solutions with various additives.

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

The present invention is designed around the principals of mitigating biological sample damage, recognizing several sources of tissue and cell damage during transport. The present invention targets osmotic damage resulting from fluctuations in temperature and energy in cells, as well as chemical damage resulting from ROS.

Osmotic stress is targeted in the present invention by two approaches used in combination. The first of the approaches is to target osmotic balance by creating a hyperosmotic solution. Salt concentrations of sodium, potassium, and chloride are balanced to be higher than plasma, and approaching that of intracellular levels. The second approach is the use of oncotic agents. These agents are, in a preferred embodiment, non-toxic disaccharides including, but not limited to, trehalose, sucralose, and raffinose. Synthetic disaccharides such as sucralose may offer similar benefits as naturally occurring disaccharides with similar safety profiles and are included in the intended options for oncotic agent. Sources of ROS targeted include metabolic waste products, ROS generated from cells under osmotic and energetic stress from mitochondria, and ROS generated from non-cellular sources including metal ions. The present invention additionally targets ion flux in cells as a potential inducer of apoptosis. Chelation of metal ions could represent an effective method of protecting cells from chemical damage and programmed cell death.

The present invention further targets energy needs of the biological material (e.g., cells, tissues, organs) by providing energy in the form of ketone bodies. Ketone bodies are an alternative energy source liberated in times of low glucose availability or high energy expenditure, and some tissues including heart and brain use ketone bodies as major energy sources even in low energy demand periods. Ketone bodies bypass glycolysis and directly enter the Krebs cycle for production of ATP, which appears to generate far less ROS compared to use of glucose as an energy source. Availability of ketone bodies therefore provides for the energy demands of cells, tissues, and organs in transport or storage even at room or body temperatures, and do so with less ROS production, reducing subsequent damage to cells.

Inevitably, some amount of potentially damaging ROS is expected to be generated. To that end, the present invention includes an antioxidant to counteract ROS production. This ROS may be generated due to metabolic processes, osmotic stress, temperature induced stress, metal ions undergoing redox reactions, or other sources. The included antioxidant should be relatively stable during storage of the solution at room temperature to obviate the need of adding the antioxidant prior to use. The included antioxidant should additionally not react with other components of the solution prior to use.

The present invention is a formulation for cryopreservation (i.e., cryopreservation composition) of biological materials that improves cell viability post-thaw and allows for reduced use of toxic cryoprotectants by combining non-toxic cryoprotectants, which reduce or eliminate the need for toxic cryoprotectants, with properties that protect cells during hypothermia, such as hyperosmotic solutions, oncotic agents, antioxidants, and metal chelators.

A preferred embodiment of the cyropreservation composition includes: a buffer hyperosmotic solution with a polymer, at least one oncotic agent, being an impermeant carbohydrate, natural or synthetic, an antioxidant, preferably with a favorable stability profile during storage, at least one ketone body to support energy requirements of cells with minimal ROS production, and a chelator to prevent further ROS production and programmed cell death.

In an embodiment, the polymer is polyethylene glycol. The polyethylene glycol has a molecular weight between 20,000-50,000 kDa at a concentration of 1%-10%. The oncotic carbohydrates can include but are not limited to trehalose, raffinose, sucrose, and/or sucralose (at a concentration of 50 mM to 1 M). The antioxidants can include but are not limited to N-acetyl-L-cysteine, N-acetyl-L-cysteine amide, L-cysteine, alpha-lipoic acid, vitamin C, and/or vitamin E (at a concentration of 0.1 mM to 10 mM). The ketone bodies can include acetoacetate and/or beta-hydroxybutyrate (at a concentration of 0.5 mM to 50 mM). The metal chelators can include but are not limited to citrate, EDTA, and/or EGTA (at a concentration of 0.5 to 5 mM). The composition may also comprise DMSO at a concentration of between 1% and 10%.

Referring now to FIG. 1, there is shown a chart depicting the viability of human cord blood cells frozen with 10% DMSO+1% dextran-40 with no additives (control), or additives of 200 mM trehalose, 5% polyethylene glycol 35000, or 5 mM N-acetyl-L-cysteine. As shown in FIG. 1, the addition of trehalose, polyethylene glycol (PEG), and N-acetyl-L-cysteine (NAC) increase the viability of the frozen human cord blood cells.

The present invention, cryopreservative solution, incorporates a hyperosmotic solution which will provide osmotic stability while the biological material is experiencing hypothermic temperatures. Extended periods at hypothermic temperatures will allow for more complete penetration of cryopreservatives around and into the biological material, and slower cooling rates that include extended time at hypothermic temperatures will reduce ice crystal formation. In an embodiment, the buffered hyperosmotic solution is buffered with phosphate to a pH of 7.0 to 8.0. This hyperosmotic solution will take the form of water with ion concentrations between and including the concentration of ions in human plasma and that of intracellular ion concentrations, with the exception of some ions which will be omitted.

Such ion concentrations will include a Na+ concentration of at least 10 mM, and a maximum of 100 mM, a K+ concentration of at least 5 mM, and a maximum of 140 mM, a Mg+2 concentration of at least 1 mM to a maximum of 25 mM, and a Cl− concentration of at least 10 mM to a maximum of 100 mM. Notably, this formulation omits inclusion of Ca+2 ions for the purpose of reducing calcium flux induced apoptosis. The buffered hyperosmotic solution can also include Adenosine at a concentration of a least 1 mM to a maximum of 5 mM. The buffered hyperosmotic solution may optionally include 0-50 mM Dextrose and/or 0-100 mM Mannitol.

The oncotic carbohydrates can include but are not limited to trehalose, raffinose, sucrose, and/or sucralose (at a concentration of 50 mM to 1 M). The antioxidants can include but are not limited to N-acetyl-L-cysteine, N-acetyl-L-cysteine amide, L-cysteine, alpha-lipoic acid, vitamin C, and/or vitamin E (at a concentration of 0.1 mM to 10 mM). The ketone bodies can include acetoacetate and/or beta-hydroxybutyrate (at a concentration of 0.5 mM to 50 mM). The metal chelators can include but are not limited to citrate, EDTA, and/or EGTA (at a concentration of 0.5 mM to 5 mM).

The cryopreservation solution (i.e., formulation or composition) described above can be used in conjunction with a cryopreservation support device to enhance cell viability. In an embodiment, the support device is a device on which the tissue could first be layered. In an embodiment, the device extends across a first side of the tissue. In an alternative embodiment, the device comprises a first portion extending on the first side of the tissue and a second portion extending on the second side of the tissue. The device can be configured with additional portions to extend along any additional sides of the tissue or other biological material.

By layering each side of the tissue along a different portion of the device, the tissue is prevented from adhering to itself and compressing within a container used during cryopreservation. Ideally, such a support device would be both flexible to fit the shape of the tissue and allow ease of insertion into multiple container types, as well as permeable (or porous) enough to allow for penetration of cryoprotectants past the support and into the tissue.

Figure 2:
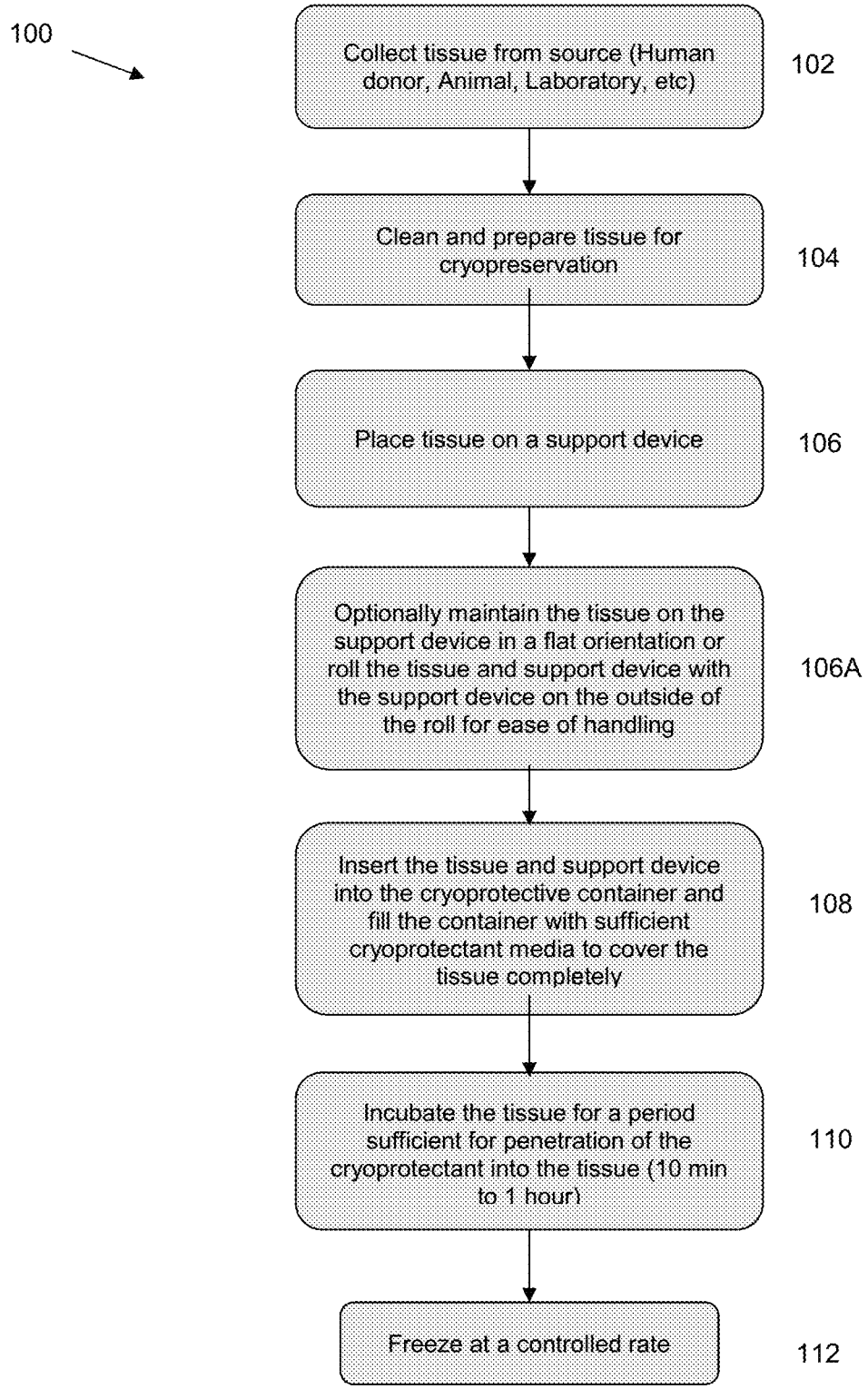
FIG. 2 is a flowchart of a method for cryopreserving tissue.

Referring now to FIG. 2, there is shown a flowchart of a method 100 for cryopreserving tissue. At the first step 102 of the method 100, tissue is collected from a source (e.g., a human donor, an animal, or a laboratory-created source). Specifically, non-limiting examples of tissues in need of cryopreservation include skin, cornea, tendons and ligaments, smooth muscle, Wharton's jelly of the umbilical cord, amnion of the umbilical cord and placenta, and chorion of the placenta. Tissues may contain viable cells or may be decellularized for preservation of the extracellular matrix as a scaffold. Similarly, artificial tissues made in a laboratory setting require improved methods for cryopreservation including tissues made from stem cells grown in natural and synthetic scaffolds and tissues printed using 3D printing technologies.

At the next step 104, the tissue is cleaned and prepared for cryopreservation. At step 106, the cleaned and prepared tissue is then placed on the support device. As described above, the support device can be any flexible support on which the tissue can be layered to achieve these aims and in a format compatible with use in cryotubes, cryobags, or another container for holding the biological material during cryopreservation. The support device can be composed from a polymer which is biocompatible including at least one of nitrocellulose, polyvinylidene fluoride, polylactic acid, poly (lactide-co-glycolide), polyethylene glycol, and polyaspartic acid.

In one embodiment, the method 100 includes the optional step 106A of maintaining the tissue on the support device in a flat orientation. The support device may also be rolled such that the tissue is maintained within the support device (i.e., like a scroll) and only the support device is exposed for ease of handling and storage.

Next, at step 108, the support device and tissue are inserted into a cryoprotective container, such as a cryotube, cryobag, or another container for holding the biological material during cryopreservation. The cryoprotective is filled within the cyroprotectant media (i.e., solution, composition, or formulation) described above. The cryoprotective container is sufficiently filled such that the cryoprotectant media covers the tissue completely.

Thereafter, at step 110, the tissue is incubated. The tissue within the cryoprotective container is incubated for a period sufficient for penetration of the cryoprotectant media into the tissue. The tissue is incubated for a period within the range of 5 minutes to 1 hour.

Finally, at step 112, the tissue is frozen at a controlled rate. The controlled freeze rate is typically between 0.5° C. per minute and 2° C. per minute. The tissue may be frozen to a temperature lower than −80° C., lyophilizing the frozen tissue. The tissue may also be frozen to temperatures lower than −120° C., lower than −150° C., and lower than −180° C.

While embodiments of the present invention have been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A composition for the transport of biological material, comprising:
   a buffered hyperosmotic solution;
   an oncotic agent;
   an antioxidant;
   a metal chelator; and
   a ketone body.

2. The composition of claim 1, wherein the buffered solution is buffered with phosphate to a pH of 7.0 to 8.0.

3. The composition of claim 1, further comprising:
   10-100 mM Na+;
   5-140 mM K+;
   1-25 mM Mg+2;
   10-100 mM Cl−; and
   1-5 mM Adenosine.

4. The composition of claim 3, further comprising 0-50 mM Dextrose.

5. The composition of claim 3, further comprising 0-100 mM Mannitol.

6. The composition of claim 1, wherein the oncotic agent is a carbohydrate.

7. The composition of claim 6, wherein the carbohydrate is at least one of: trehalose, sucrose, raffinose, and sucralose, at a concentration of 50 mM-1 M.

8. The composition of claim 1, wherein the antioxidant is at least one of N-acetyl-L-cysteine, N-acetyl-L-cysteine amide, L-cysteine, glutathione, alpha-lipoic acid, vitamin C, and vitamin E, at a concentration of 0.1 mM-10 mM.

9. The composition of claim 1, wherein the ketone body is at least one of acetoacetate and beta-hydroxybutyrate, at a concentration of 0.5 mM-50 mM.

10. The composition of claim 1, wherein the metal chelator is at least one of citrate, EDTA, and EGTA, at a concentration of 0.5 mM-5 mM.

11. A cryoprotectant composition for the cryogenic freezing and storage of live biological material, comprising:
    a buffered hyperosmotic solution;
    a polymer;
    an oncotic agent;
    an antioxidant;
    a metal chelator;
    and a ketone body.

12. The composition of claim 11, further comprising:
    10-100 mM Na+;
    5-140 mM K+;
    1-25 mM Mg+2;
    10-100 mM Cl−; and
    1-5 mM Adenosine.

13. The composition of claim 12, further comprising 0-50 mM Dextrose.

14. The composition of claim 12, further comprising 0-100 mM Mannitol.

15. The composition of claim 11, wherein the polymer is polyethylene glycol.

16. The composition of claim 11, wherein the polyethylene glycol has a molecular weight between 20,000-50,000 kDa at a concentration of 1%-10%.

17. The composition of claim 10, further comprising DMSO at a concentration of between 1% and 10%.

* * * * *